United States Patent [19]

Ryde et al.

[11] 3,863,633

[45] Feb. 4, 1975

[54] COMPOSITION CONTAINING A SUBSTANCE SHOWING A TOPICAL EFFECT ON THE EYE, AND A METHOD OF PREPARING THE SAME

[75] Inventors: Emma Marta Ryde; Jan Erik Ekstedt, both of Uppsala, Sweden

[73] Assignee: Pharmacia Aktiebolag, Uppsala, Sweden

[22] Filed: May 24, 1972

[21] Appl. No.: 256,243

[30] Foreign Application Priority Data

June 4, 1971 Sweden.......................... 7221/71

[52] U.S. Cl...................... 128/260, 424/28, 424/78
[51] Int. Cl....................... A61m 7/00, A61m 31/00
[58] Field of Search ................. 424/28, 78; 128/260

[56] References Cited
UNITED STATES PATENTS

| | | | |
|---|---|---|---|
| 108,034 | 10/1870 | Kraus................................. | 424/360 |
| 273,410 | 3/1883 | Wadleigh....................... | 424/358 X |
| 3,075,527 | 1/1963 | Bechtold............................ | 128/260 |
| 3,150,045 | 9/1964 | Boghosian............................ | 424/78 |
| 3,311,577 | 3/1967 | Rankin................................. | 424/80 |
| 3,592,930 | 7/1971 | Katz et al............................ | 424/243 |
| 3,640,741 | 2/1972 | Etes..................................... | 106/170 |

OTHER PUBLICATIONS

Martindale, The Extra Pharmacopoela, 21st Ed., Vol. 1, (1936), p. 613(Ophthalmic Lamellae or Discs), 228–231, 234, 386–388, 566, 760–765, 1124.

*Primary Examiner*—Shep K. Rose
*Attorney, Agent, or Firm*—Fred Philpitt

[57] ABSTRACT

A composition containing a substance having a topical effect on the eye, which composition comprises a mixture of 5 – 60 percent of at least one lipophilic substance having a melting point of 37° – .75°C, 5 – 40 percent of at least one water-soluble or water-swellable polymer in solid, finely-divided form, 0.05 – 30 percent of at least one substance having a topical effect on the eye and being in solid, finely-divided form, and 10 – 80 percent of at least one surface active higher alcohol having 12 – 22 carbon atoms to serve as a stabilizer for the mixture, the percentages relating to percent by weight calculated on the total weight of the mixture.

15 Claims, No Drawings

3,863,633

COMPOSITION CONTAINING A SUBSTANCE SHOWING A TOPICAL EFFECT ON THE EYE, AND A METHOD OF PREPARING THE SAME

The present invention relates to a composition containing a substance which shows a topical effect on the eye, such as a drug for glaucoma therapy, and a method of preparing the same.

The eye disease glaucoma often occurs in human beings before they have reached the age of forty. The disease is characterized by an abnormal elevation of the pressure within the eyeball and may result in loss of vision. Some few percent of the total population are afflicted with glaucoma. At present, glaucoma patients are normally treated with eye-drops containing for example, pilocarpine hydrochloride, which reduces the pressure within the eye ball. The effect produced by the eye-drops is a short duration and the drops must therefore be administered several times each day. When administering the drops, a temporary overdose is obtained, whereafter the substance is rapidly flushed away by the limpid fluid secreted in the eye by the lashrymol gland. Thus, when administering pilocarpine eye-drops, the eye obtains a myopic condition (caused by the temporary overdose of pilocarpine), which lasts for several hours. Thus, subsequently to being given the aforementioned eye-drops, many patients temporarily lose their ability to work as a result of myopia. As a result of the relatively short duration of the effect produced by the eye-drops, a dose administered in the evening is often insufficient to last the night. Consequently, there is nothing to prevent an extremely dangerous increase of the pressure within the eye from taking place during the night, unless the patient is awakened and given a new dose. such increase in pressure during the night may result in loss of vision of the patient. For the purpose of obtaining a prolonged effect, attempts have been made to use creams or ointments containing pilocarpine, although the result has been relatively poor in the intended respect. Moreover, the ointment spreads to the corneous tunic of the eye, causing discomfort and difficulties with vision. In addition, such ointments are difficult to maintain sterile during their period of use.

These and other disadvantages are eliminated by means of the present invention, which enables drugs for glaucoma therapy to be administered in an advantageous manner. The invention also enables other substances which present a topical effect on the eye to be administered to advantage.

The present invention relates to a composition containing a substance showing a topical effect on the eye, the composition comprising a mixture of 5-60 percent, preferably 10-45 percent of one or more lipophilic substances having a melting point of 37°-75°C, 5-40 percent, preferably 10-30 percent of one or more water-soluble or water-swellable polymers in solid, finely-divided form, 0.05-30 percent, preferably 0.5-20 percent of one or more substances having a topical effect on the eye and being present in solid, finely-divided form, and 10-80 percent, preferably 10-60 percent, for example 15-50 percent of one or more surface active higher alcohols having 12-22 carbon atoms, preferably 16-20 carbon atoms which serves as a stabilizer for the mixture, the percentages denoting percent by weight calculated on the total weight of the mixture. In accordance with a preferred embodiment, the composition is in the form of a dosage unit comprising a solid shaped body intended to be inserted in the eye cavity. By eye cavity is meant here and in the following claims the space between the eye and the surrounding tissue, e.g. beneath the upper eye lid.

The present invention also relates to a method of preparing a dosage unit from a substance having a topical effect on the eye, the dosage unit comprising a solid shaped body intended to be inserted in the eye cavity. The method of the invention is characterized by forming a solid body or unit from a mixture obtained from 5-60 percent, preferably 10-45 percent of one or more lipophilic substances having a melting point of 37°-75°C, 5-40 percent, preferably 10-30 percent of one or more water-soluble or waterswellable polymers is solid, finely-divided form, and 0.05-30 percent, preferably 0.5-20 percent of one or more substances showing a topical effect on the eye and being in solid, finely-divided form, and 10-80 percent, preferably 10-60 percent, for example 15-50 percent of one or more surface active higher alcohols having 12-22 carbon atoms, preferably 16-20 carbon atoms and serving as a stabilizer for the mixture, the percentages being percentages by weight calculated on the total weight of the mixture, wherewith the ingredients of the mixture are dispersed with each other, and wherein a solid body or unit is prepared from the mixture by molding or pressing, the body being given a largest dimension between the limits 2 and 20 mm, preferably between the limits 6 and 16 mm.

The lipophilic substance or substances having a melting point of 37°-75°C may comprise, for example, a higher hydrocarbon, a wax or a fat or mixtures of these substances. Preferably there is selected a lipophilic substance or mixtures of such having a melting point of 38°-55°C, which in combination with the higher alcohol or alcohols soften slightly at body temperature without melting. In this way, the shpaed body causes but very slight irritation when placed in the eye cavity.

When lipophilic substance used is in the form of a hydrocarbon, mixtures can be used, for example, comprising mainlyn-paraffins and to a lesser extent isomers of such paraffins, the mixtures being obtained by distilling petroleum. The wax used may, for example, be in form of beeswax, comprising a mixture of mainly triocontanol-palmitate, n-hexacosanolic acid ($C_{26}H_{52}O_2$) and hydrocarbons. With fats is primarily meant glycerol esters of fatty acids having 8-22 carbon atoms, preferably 10-18 carbon atoms.

The surface active higher alcohol or alcohols having 12-22 carbon atoms, preferably 16-20 carbon atoms, may have a straight or branched carbon chain. Examples of such alcohols include aliphatic alcohols such as 1-docosanol, 1-hexadecanol, 1-octadecanol, 1-dedecanol. Further examples are 1-tridecanol, 1-tetradecanol, 1-heptadecanol, 2-heptadecanol, 9-heptadecanol, 1-eicosanol and 2-eicosanol. Mixtures of two or more such alcohols may also be used. The surface active alcohol acts as a stabilizer for the mixture and also as a wetting agent. Further, after administration it is favourably active in the liberation of the substance showing a topical effect on the eye. With contents in excess of approximately 50 percent, there is preferably used a mixture of two or more alcohols.

The water-soluble or water-swellable polymer or polymers may, for example, contain hydroxyl groups and/or amino groups and/or amide groups and/or carboxyl groups. Preferably there is used water-soluble polymers which dissolve subsequent to being previously swollen to a gel-like mass. Mixtures of two or more such polymers may also be used. Examples of polymers which may be used include dextran, lower hydroxy-alkyl dextran, carboxy-methyl dextran, lower hydroxy-alkyl cellulose, lower alkyl cellulose, carboxymethyl cellulose, polyvinyl alcohol, dextrin, starch, polyvinyl pyrrolidone and polyalkylene glycols. The particle size of the solid polymer are preferably selected to be less than 100 mesh and greater than 550 mesh, i.e., within the range of approximately 150 $\mu$ - approximately 30 $\mu$.

The substance showing a topical effect on the eye is preferably a drug for glaucoma therapy. Examples of such drugs for use in the present context include mainly pilocarpine. Other examples are adrenaline, physostigmine and synstegmine and echathiapate iodide, diisopropyl fluorophosphate, carbacholine, demecarium bromide, ascorbic acid and guanetidine. Examples of other substances presenting a topical effect on the eye and which may be included in the composition of the present invention are substances having a mydriatic effect such as metaoxedrine, atropin, cyclopentolate and tripicamide. These substances are preferably used in the form of physiologically acceptable salts. Mixtures of such substances may also be used. The particle size of the solid substance presenting a topical effect on the eye is preferably selected smaller than 100 mesh and greater than 550 mesh, i.e., whithin the range of approximately 150 $\mu$ — approximately 30 $\mu$.

Naturally, all constituents of the dosage unit are selected from substances which are physiologically acceptable in the eye cavity when using the dosage unit.

In accordance with the invention, the solid shaped body is given a largest dimension between the limits 2-20 mm. preferably between the limits 6-16 mm. Remaining dimensions of the unit lie preferably within the limits 0.4-1.6 mm, such as within the limits 0.5-10 mm, the smallest dimension preferably lying within the limits 0.5-5 mm, e.g. within the range 0.8-3 mm. The weight of the solid shaped body or unit preferably lies within the limit 0.08-0.25 g, e.g. within the limits 0.1-0.19 g.

The dosage unit for substances having a topical effect on the eye in accordance with the invention is thus characterized in that the unit comprises a solid shaped body intended to be inserted in the eye cavity, the solid shaped body being formed of a mixture obtained from 5-60 percent, preferably 10-45 percent of one or more lipophilic substances having a melting point of 37°-75°C, 5-40 percent, preferably 10-30 percent of one or more water-soluble or water-swellable polymers in solid, finally-divided form, 0.05-30 percent, preferably 0.5-20 percent of one or more substances having a topical effect on the eye and being in solid, finely-divided form, and 10-80 percent, preferably 10-60 percent, for example 15-50 percent of one or more surface active higher alcohols having 12-22 carbon atoms, preferably 16-20 carbon atoms, and serving as a stabilizer for the mixture, the percentages being in percent by weight calculated on the weight of the whole mixture and the constituents of the mixture being dispersed with each other and the solid body being prepared from the mixture by molding or pressing, said body being given a largest dimension between the limits 2-20 mm, preferably 6-16 mm.

In order to obtain the mixture from which the solid bodies are formed, the constituents may be dispersed together in finely-divided solid form. Solid bodies of desired configuration can then be produced from the mixture by pressing the same in suitable pressing tools. In accordance with one preferred method of preparing the mixture from which the solid bodies are to be formed, the polymer or polymers and the substance or substances having a topical effect on the eye are dispersed in solid, finely-divided form in a melt of the lipophilic substance or substances and the surface active higher alcohol or alcohols. The melt is then molded (with the solid substances homogeneously dispersed therein) in suitable molds, which at the same time may serve as packeting material and which may be sealed in a sterile environment. Packeting of the solid bodies may be effected so that when using the same, only the dosage unit to be used at that moment is released from the package and the remaining units remain in their sterile environment. Because the solid bodies contain no water, there is little risk of microbial growth therein.

If desired, however, the mixture may be admixed with antimicrobial substances, e.g. preserving agents in solid, finely-divided form or optionally dissolved in the melt of the lipophilic substance and the higher alcohol.

When forming the solid bodies, they are given softly rounded corners so as not to cause irritation to the eye when inserted into the eye cavity and subsequent thereto. The solid bodies are suitably formed so as to obtain a convex and a concave surface substantially in the shape of a lens which fits into the cavity between the eye and surrounding tissue, the concave surface being turned towards the eye. The solid body, however, may be shaped with two convex surfaces.

One simple manner of obtaining a unit presenting a convex and a concave surface and with rounded edges is to use the aforementioned molding technique, the bottom of the mold being constructed to give the body a convex surface and the concave surface being obtained by adjusting the surface tension of the melt, the melt thereby obtaining an adjusted contact angle to the wall of the mold, and with subsequent solidification of the melt a concave surface is obtained on the upper free surface of the melt.

The aforedescribed shaped bodies or units form a highly advantageous dosage unit for drugs for glaucoma therapy, since the drug is released slowly and continuously therefrom. The speed at which the drug is released can be varied by varying the quantities of the ingredients. For example, the speed at which the drug for glaucoma therapy is released may be selected so that only one or two doses may be administered per day. The interval between doages may be made longer by selecting a slower release time. Because of the slow release, it is possible to avoid the over dosages of short duration obtained with the previously mentioned eye drops.

It is possible to control still further the speed at which the drugs for glaucoma therapy are released from the unit produced in accordance with the invention, by coating the unit on one side with a non-permeable film or a film which is slowly dissolved without forming solid residues.

When the unit is placed in the eye cavity and comes into contact with tear fluid the polymer, which comes into contact with the fluid, dissolves into a viscous solution or a gel-like envelope around the unit. The dissolution of the polymer which may take place subsequent to previous swelling of the same, forms a lubricating envelope around the unit, which in cooperation with the shape of the unit contributes to preventing mechanical irritation of the eye as a result of the unit and prevents the unit from remaining in a specific position in the eye cavity, since it enables the unit to change position within the cavity, to the added comfort of the patient. Further, the gel-like envelope obtained around the unit also forms a diffusion barrier for the drug or drugs for glaucoma therapy and therewith prevents a topical overdose with subsequent accompanying irritation.

For the purpose of inserting the unit into the cavity of the eye, an applicator in the form of a cylindrical rod may be used, the rod having an accurately chamfered portion at one end thereof in which is located a diametrically extending slot. The slot is used as a unit-retaining means when administering the dose. The applicator is suitably made of a soft elastic material. After use, and before inserting the next unit, the administered unit is easily removed, by carefully pulling the eye lid away from the eye, whereafter the patient leans forward and the unit falls out.

The invention will now be described and illustrated with reference to a number of examples. Following the examples is a report showing the release of pilocarpine hydrochloride and other substances from dosage units according to the invention with in vitro tests. Further, there is also made a report showing the results obtained from studies of the effects of pilocarpine hydrochloride when administering the drug for glaucoma therapy in the form of solid units in accordance with the invention on rabbits and human beings.

EXAMPLE 1

A mixture is preapred from the following ingredients:

| | |
|---|---|
| Paraffin, solid (melting point 46–48°C) | 13.8 % |
| Cetyl alcohol | 50.0 % |
| Polyvinyl alcohol (Gelvatol$^{(R)}$20–60), particle size < 100 mesh | 21.2 % |
| Pilocarpine hydrochloride particle size < 100 mesh | 15.0 % |
| | 100.0 % |

The paraffin and cetyl alcohol are melted at 50°–60°C, whereafter the melt is maintained within this temperature range, preferably at 55°C, while the solid units are being formed. Polyvinyl alcohol and pilocarpine hydrochloride (both in solid, finely-divided form) are admixed with the melt under strong agitation, using for example a turbine agitator, for approximately 30 minutes. The melt is transferred to a double-wall container provided with drainage means and a planet-type or spinal-shaped agitator, in which container the units are molded from the melt. The double-wall container is heated, for example, by circulating hot water (58°–60°C) in the space between the two walls without the water coming into contact with the melt. Determined dosages of the melt are then tapped from the container. The tapped dosage units are caught in specially designed molds and solidified therein by cooling the molds. The molds are constructed so that a convex surface is obtained on the unit by adjusting the melt to the shape of the mold. The unit also obtained a concave surface, formed by the surface tension of the melt and the contact angle to the molds. The units are manufactured totally aseptically in a sterile chamber with sterilized apparatus and sterile substances. With this example, there is used a mold which gives the unit a largest dimension of 13 mm and a smallest dimension of approximately 2.5 mm, the remaining dimension of the unit in this case being 7.5 mm. The weight of the unit obtained in this case is approximately 0.12 g.

EXAMPLE 2

A mixture is prepared from the following constituents:

| | |
|---|---|
| Paraffin, solid (melting point 46–48°C) | 13.8 % |
| Cetyl alcohol | 50.0 % |
| Methyl cellulose (1500 cp) particle size < 100 mesh | 21.2 % |
| Pilocarpine hydrochloride particle size < 100 mesh | 15.0 % |
| | 100.0 % |

The paraffin and cetyl alcohol are shredded into fine granulates and then mixed with methyl cellulose and pilocarpine hydrochloride in finely-divided solid form in a double cone mixer, in which the sterility of the substance can be maintained by completely sealing the mixing chamber. The finished mixture is then pressed into divided units using pressing tools adapted for the purpose. The units are manufactured aseptically in a sterile chamber. By varying the design of the pressing tool, units are obtained with a largest dimension between 6–16 mm and remaining dimensions between the limits 0.4–16 mm, the smallest dimension of the units being between the limits 0.5–5 mm. The weight of each unit can be varied, for example, between 0.08 g and 0.2 g. The press tool is constructed so that the unit obtains either a convex and a concave surface or two convex surfaces.

EXAMPLE 3

A mixture is prepared from the following constituents:

| | |
|---|---|
| Hard fat (Pharm. Nord.) | 20.0 % |
| Cetyl alcohol | 50.0 % |
| Polyvinyl alcohol (Gelvatol$^{(R)}$20–60) particle size < 100 mesh | 15.0 % |
| Pilocarpine hydrochloride particle size < 100 mesh | 15.0 % |
| | 100.0 % |

The units are prepared and produced as described in Example 1 or Example 2.

EXAMPLE 4

A mixture is prepared from the following constituents:

| | |
|---|---|
| Paraffin, solid (melting point 46–48°C) | 20.0 % |
| Cetyl alcohol | 50.0 % |
| Polyvinyl alcohol (Rhodoviol$^{(R)}$14/125 P) particle size < 100 mesh | 15.0 % |
| Pilocarpine hydrochloride particle size < 100 mesh | 15.0 % |
| | 100.0 % |

The units are prepared and produced as described in Example 1 or Example 2.

EXAMPLE 5

A mixture is prepared from the following ingredients:

| | |
|---|---|
| Wax (Pharm. Nord.) | 20.0 % |
| Cetyl alcohol | 50.0 % |
| Polyvinyl alcohol (Rhodoviol(R)14/125 P) particle size < 100 mesh | 15.0 % |
| Pilocarpine hydrochloride particle size < 100 mesh | 15.0 % |
| | 100.0 % |

The units are prepared and produced as described in Example 1 or Example 2.

EXAMPLE 6

A mixture is prepared from the following ingredients:

| | |
|---|---|
| Paraffin, solid (melting point 46–48°C) | 35.0 % |
| Stearyl alcohol | 35.0 % |
| Dextrin, particle size < 100 mesh | 20.0 % |
| Atropin sulphate, particle size < 100 mesh | 10.0 % |
| | 100.0 % |

The units are preapred and produced as described in Example 1 and Example 2.

EXAMPLE 7

The units are prepared analogously with Example 6, although cetyl alcohol is used instead of stearyl alcohol.

EXAMPLE 8

The units are produced analogously with Example 6, although polyvinyl alcohol (Rhodoviol $^R$ 14/125 P, particle size <100 mesh) is used instead of dextrin.

EXAMPLE 9

The units are produced analogously with Example 6, although dextran (average molecular weight $M_w$ approx. 8.000, particle size <100 mesh) is used instead of dextrin.

EXAMPLE 10

A mixture is prepared from the following ingredients:

| | |
|---|---|
| Paraffin, solid (melting point 46–48°C) | 49.0 % |
| Cetyl alcohol | 20.0 % |
| Dextrin (particle size < 100 mesh) | 16.0 % |
| Ascorbic acid (particle size < 100 mesh) | 15.0 % |
| | 100.0 % |

The units are prepared and produced as described in Example 1 or Example 2.

EXAMPLE 11

The units are prepared analogously with Example 10, although metaoxedrin (particle size <200 mesh) is used instead of ascorbic acid.

EXAMPLE 12

The units are produced analogously with Example 3, although polyvinyl pyrrolidone (mean molecular weight $M_w$ approx. 40.000, particle size <100 mesh) is used instead of polyvinyl alcohol.

EXAMPLE 13

A mixture is prepared from the following ingredients:

| | |
|---|---|
| Paraffin, solid (melting point 46–48°C) | 36.0 % |
| Cetyl alcohol | 37.0 % |
| Dextrin, particle size < 100 mesh) | 12.0 % |
| Pilocarpine hydrochloride particle size < 100 mesh | 15.0 % |
| | 100.0 % |

The units are prepared and produced as described in Example 1 or Example 2.

EXAMPLE 14

The units are produced analogously with Example 2 or 3, although tristearin is used instead of paraffin, in solid form resp. hard fat.

EXAMPLE 15

The units are produced analogously with Example 6, although tristearin is used instead of paraffin in solid form.

EXAMPLE 16

A mixture is prepared from the following ingredients:

| | |
|---|---|
| Paraffin, solid (melting point 46–48°C) | 49.0 % |
| Cetyl alcohol | 20.0 % |
| Dextran (mean molecular weight approx. 8.000), particle size < 100 mesh | 16.0 % |
| Metaoxedrin, particle size < 100 mesh | 15.0 % |
| | 100.0 % |

The units are prepared and produced as described in Example 1 or Example 2.

EXAMPLE 17

The units are prepared analogously with Example 16, although starch having a particle size of <100 mesh is used instead of dextran.

EXAMPLE 18

A mixture is prepared from the following ingredients:

| | |
|---|---|
| Paraffin, solid (melting point 46–48°C) | 54.0 % |
| 1-docosanol | 11.0 % |
| Dextran (mean molecular weight approx. 8.000), particle size < 100 mesh | 20.0 % |
| Pilocarpine hydrochloride particle size < 100 mesh | 15.0 % |
| | 100.0 % |

The units are prepared and produced as described in Example 1 or Example 2.

EXAMPLE 19

The units are produced analogously with Example 18, although 1-tridecanol is used instead of 1-docosanol.

EXAMPLE 20

The units are produced analogously with Example 16, although physostigmine salicylate (particle size < 100 mesh) is used instead of metaoxedrin.

EXAMPLE 21

The units are produced analogously with Example 16, although synstigmine (particle size < 100 mesh) is used instead of metaoxedrin.

EXAMPLE 22

The units are produced analogously with Example 16, although adrenalin nitartrate (particle size < 100 mesh) are used instead of metaoxedrin.

EXAMPLE 23

The units are produced analogously with Example 16, although guanetidine sulphate (particle size < 100 mesh) is used instead of metaoxedrin.

EXAMPLE 24

The units are produced analogously with Example 18, although 7.7 percent cetyl alcohol and 3.3 percent stearyl alcohol are used instead of 11.0 percent 1-docosanol.

The units obtained in accordance with the invention have been tested in vitro and in vivo on both animals and human beings.

With the in vitro tests, the following method was used:

A unit was placed on a network of filaments extended approximately 2 mm from the bottom of a small container, e.g. a container $2 \times 2 \times 0.5$ cm in size. 0.5 ml of a 0.9 percent common salt solution was introduced to the container so that the bottom surface of the unit was well covered by the liquid. More liquid was introduced into the container from the container lid via a hose placed so that the liquid ran over the upper surface of the unit.

The liquid was introduced to the container continuously by means of a pump at a speed of 1.5 ml/hour. Simultaneously, liquid was removed from the container at the same speed via a bottom drain. At suitable time intervals, the quantity of active substance removed was determined, i.e., the quantity of active substance released from the unit during the time interval in question. The described apparatus is intended to reproduce to some extent the conditions prevailing in the eye, and the intention herewith is to obtain an understanding of the release speed in the eye and to correlate the same to the effect in vivo.

The table I shows the amount of substance (pilocarpine hydrochloride) released in vitro at certain periods of time in respect of a unit produced in accordance with Example 1. The quantities of substance released relate to cumulative values in percent of the total quantity.

TABLE I

| Time/hours | Cumulative percent released pilocarpine hydrochloride (of the total quantity) |
|---|---|
| 0.5 | 0.8 |
| 2 | 6.9 |
| 4 | 11.1 |
| 6 | 12.8 |
| 12 | 20.3 |
| 22 | 32.1 |
| 25.5 | 35.7 |
| 29.25 | 40.1 |
| 36.5 | 48.0 |
| 48 | 58.4 |

Table II shows the quantity of substance (metaoxedrin) released in vitro over certain periods of time in respect of a unit produced by the molding method described in Example 11. The released quantities of substance relate to cumulative values in percent of the total quantity.

TABLE II

| Time/hours | Cumulative percent released metaoxedrin (of total quantity) |
|---|---|
| 0.5 | 0.6 |
| 1.0 | 1.0 |
| 2.75 | 1.9 |
| 5 | 2.7 |
| 7.75 | 3.6 |
| 24 | 9.3 |

Table III shows the quantity of substance (pilocarpine hydrochloride) released in vitro over certain periods of time in respect of the unit produced by the molding method described in Example 13.

The released quantities of substance relate to cumulative values in percent of the total quantity.

TABLE III

| Time/hours | Cumulative percent released pilocarpine hydrochloride (of the total quantity) |
|---|---|
| 0.5 | 0.3 |
| 1.0 | 1.1 |
| 2.5 | 2.8 |
| 5.5 | 6.4 |
| 7.5 | 8.1 |
| 24 | 21.6 |

Tests were made on animals i.a. in the following manner:

The effect of units produced in accordance with Example 1 was tested on the eye of a rabbit, the pupil reducing effect of the pilocarpine being used as a measuring parameter. The units were placed beneath the upper eyelid of one eye of each of four rabbits. The other eye of the rabbits was used for checking purposes. The diameter of the pupil was estimated (using special measuring sticks with circular openings of different diameters) after 15, 30, 45, 60, 90, 120, 210 and 270 minutes, whereafter the units were removed. A uniform 40-25--percent reduction in the diameter of the pupil was observed during the whole of this period. At the same time, the test with pilocarpine hydrochlorid (4-percent aqueous solution) showed a 45 percent reduction in pupil diameter after 20 minutes, although a much smaller effect with remaining measurements and only a 15 percent reduction after 2 hours.

The unit of the present invention thus provides a long-term, uniform reduction in the diameter of the pupil of a rabbit.

Tests were made on human beings i.a. in the following manner:

A unit produced in accordance with Example 1 above was applied in the space between one eye and surrounding tissue (the unit being placed under the upper eyelid) on the human subject, the effect on the treated eye being studied.

In addition to the pupil reducing effect, pilocarpine was also characterized by its ability to affect accomodation, so that the distance for clear vision of a normal eye was moved from infinity to measurable values. This effect of pilocarpine has been used as a measuring variable with the tests made on human beings.

The results of such a test are illustrated in Table IV.

TABLE IV

| Time after application | Distance for clear vision | Accomodation in dioptres | Pupil effect |
|---|---|---|---|
| 6 min. | ∞ | 0 | 0 |
| 16 min. | ∞ | 0 | 0 |
| 17 min. | 30 m | 0.03 | 0 |
| 18 min. | 3 m | 0.3 | progressive decrease |
| 19 min. | 1.5 m | 0.7 | do. |
| 20 min. | 50 cm | 2 | do. |
| 23 min. | 40 cm | 2.5 | do. |
| 26 min. | 30 cm | 3.5 | do. |
| 35 min. | 27 cm | 3.75 | do. |
| 48 min. | 25 cm | 4 | minimum pupil |
| 56 min. | 30 cm | 3.5 | do. |
| 7 hours | 30 cm | 3.5 | do. |
| The unit was removed after 7 hours | | | |
| 8 hours | ∞ | 0 | some decrease |

As will be evident from the table the effect on the accomodation reaches a plateau value after approximately half an hour, which is then maintained for the whole of the time the unit is retained in the eye. The unit was not observed to cause any form of irritation. The test showed an advantageous long-term effect.

What we claim is:

1. A composition in the form of a solid lens-shaped body having at least one curved surface and softly rounded corners which is adapted for insertion in the cavity between the eye and surrounding tissue, said shaped body retaining its shape during the whole time of use and containing a substance having a topical effect on the eye, which composition comprises a mixture of
   a. 5 – 60 percent of at least one lipophilic substance having a melting point of 37 – 75°C and being selected from the group consisting of higher hydrocarbons, waxes, fats and mixtures thereof that are physiologically acceptable in the eye cavity,
   b. 5 – 40 percent of at least one water-soluble or water-swellable polymer in solid, finely divided form and being selected from the group consisting of dextran, lower hydroxy-alkyl dextran, carboxymethyl dextran, lower hydroxy-alkyl cellulose, lower alkyl cellulose, carboxy-methyl cellulose, polyvinyl alcohol, dextrin, starch, polyvinyl pyrrolidone and polyalkylene glycols, the particle size of the solid polymer being less than approximately 150 microns,
   c. 0.05 – 30 percent of at least one substance having a topical effect on the eye, being in solid, finely-divided form, with a particle size less than approximately 150 microns, and being selected from the group consisting of drugs for glaucoma therapy and substances showing a mydriatic effect,
   d. 10 – 80 percent of at least one member of the group consisting of aliphatic monalcohols having 13 – 22 carbon atoms to serve as stabilizer for the mixture, the percentages relating to percent by weight calculated on the total weight of the mixture, whereby when said solid shaped body is inserted in an eye cavity and comes into contact with tear fluid, the polymer set forth in (b) which comes into contact with the tear fluid dissolves into a viscous solution or gel-like envelope that acts as a lubricating envelope, which, in cooperation with the shape of the unit 1. contributes to preventing mechanical irritation of the eye as a result of the shaped body and prevents the body from remaining in a specific position in the eye cavity, since it enables the unit to change position within the cavity,
2. forms a diffusion barrier for the drug or drugs for glaucoma therapy and therewith prevents a topical overdose with subsequent accompanying irritation, and
3. is free from difficulties with vision caused by ointment spread to the corneus tunic of the eye.

2. A composition according to claim 1, wherein the aliphatic monoalcohol is 1-tridecanol, 1-hexadecanol, 1-octadecanol or 1-dodecanol or mixtures thereof.

3. A composition according to claim 1 wherein the solid shaped body has a largest dimension lying between the limits 2 and 20 mm.

4. A composition according to claim 1 wherein the solid shaped body has a largest dimension lying between the limits 6 and 16 mm.

5. A composition according to claim 1 wherein at least one surface of the solid shaped body is convex.

6. A composition according to claim 1 wherein the drug for glaucoma therapy comprises pilocarpine, adrenalide, physostigmine or synstigmine or salts thereof, either separately or in combination.

7. A composition according to claim 1 wherein the substance showing a mydriatic effect is metaoxedrin or atropin or therapeutically acceptable salts thereof.

8. A composition in the form of a solid lens-shaped body having at least one curved surface and softly rounded corners which is adapted for insertion into the cavity between the eye and surrounding tissue, said shaped body retaining its shape during the whole time of use and containing a substance having a topical effect on the eye, which composition comprises a mixture of
   a. 10 – 45 percent of at least one lipophilic substance having a melting point of 37° – 75°C and being selected from the group consisting of higher hydrocarbons, waxes, fats and mixtures thereof,
   b. 10 – 30 percent of at least one water-soluble or water-swellable polymer in solid, finely-divided form and being selected from the group consisting of dextran, lower hydroxy-alkyl dextran, carboxymethyl dextran, lower hydroxy-alkyl cellulose, lower alkyl cellulose, carboxy-methyl cellulose, polyvinyl alcohol, dextrin, starch, polyvinyl pyrrolidone and polyalkylene glycols, the particle size of the solid polymer being less than approximately 150 microns.
   c. 0.5 – 20 percent of at least one substance having a topical effect on the eye, being in solid, finely-divided form with a particle size less than approximately 150 microns, and being selected from the group consisting of drugs for glaucoma therapy and substances showing a mydriatic effect,
   d. 10 – 50 percent of at least one member of the group consisting of aliphatic monoalcohols having 13 – 22 carbon atoms to serve as stabilizer for the mixture, the percentages relating to percent by weight calculated on the total weight of the mixture, whereby when said solid shaped body is inserted in an eye cavity and comes into contact with tear fluid, the polymer set forth in (b) which comes into contact with the tear fluid dissolves into a viscous solution or gel-like envelope that acts as a lubricating envelope, which, in cooperation with the shape of the unit
1. contributes to preventing mechanical irritation of the eye as a result of the shaped body and prevents the body from remaining in a specific position in the eye cavity, since it enables the unit to change position within the cavity,
2. forms a diffusion barrier for the drug or drugs for glaucoma therapy and therewith prevents a topical overdose with subsequent accompanying irritation, and
3. is free from difficulties with vision caused by ointment spread to the corneus tunic of the eye.

9. In the art of medicating the eye with ophthalmic medication the improvement which consists of the step of placing beneath one eyelid a solid lens-shaped body having at least one curved surface and softly rounded corners which is adapted for insertion into the cavity between the eye and surrounding tissue, said shaped body retaining its shape during the whole time of use and containing a substance having a topical effect on the eye, which composition comprises a mixture of
 a. 5 – 60 percent of at least one lipophilic substance having a melting point of 37° – 75°C and being selected from the group consisting of higher hydrocarbons, waxes, fats and mixtures thereof,
 b. 5 – 40 percent of at least one water-soluble or water-swellable polymer in solid, finely divided form and being selected from the group consisting of dextran, lower hydroxy-alkyl dextran, carboxymethyl dextran, lower hydroxy-alkyl cellulose, lower alkyl cellulose, carboxy-methyl cellulose, polyvinyl aclochol, dextrin, starch, polyvinyl pyrrolidone and polyalkylene glycols, the particle size of the solid polymer being less than approximately 150 microns,
 c. 0.05 – 30 percent of at least one substance having a topical effect on the eye, being in solid, finely-divided form, with a particle size less than approximately 150 microns, and being selected from the group consisting of drugs for glaucoma therapy and substances showing a mydriatic effect,
 d. 10 – 80 percent of at least one member of the group consisting of aliphatic monoalcohols having 13 – 22 carbon atoms, to serve as stabilizer for the mixture,
the percentages relating to percent by weight calculated on the total weight of the mixture, whereby when said solid shaped body is inserted in an eye cavity and comes into contact with tear fluid, the polymer set forth in (b) which comes into contact with the tear fluid dissolves into a viscous solution or gel-like envelope that acts as a lubricating envelope, which, in cooperation with the shape of the unit
 1. contributes to preventing mechanical irritation of the eye as a result of the shaped body and prevents the body from remaining in a specific position in the eye cavity, since it enables the unit to change position within the cavity,
 2. forms a diffusion barrier for the drug or drugs for glaucoma therapy and therewith prevents a topical overdose with subsequent accompanying irritation, and
 3. is free from difficulties with vision caused by ointment spread to the corneus tunic of the eye.

10. Medication according to claim 9 wherein the solid shaped body has a largest dimension lying between the limits 2 and 20 mm.

11. Medication according to claim 9 wherein the solid shaped body has a largest dimension lying between the limits 6 and 16 mm.

12. Medication according to claim 9 wherein at least one surface of the solid shaped body is convex.

13. Medication according to claim 9 wherein the drug for glaucoma theraphy comprises pilocarpine, adrenaline, physostigmine or synstigmine or salts thereof, either separately or in combination.

14. Medication according to claim 9 wherein the substance showing a mydriatic effect is metaoxedrin or atropin or therapeutically acceptable salts thereof.

15. In the art of medicating the eye with opthalmic medication the improvement which consists of the step of placing beneath one eyelid a solid lens-shaped body having at least one curved surface and softly rounded corners which is adapted for insertion into the cavity between the eye and surrounding tissue, said shaped body retaining its shape during the whole time of use, and containing a substance having a topical effect on the eye, which composition comprises a mixture of
 a. 10 – 45 percent of at least one lipophilic substance having a melting point of 37° – 75°C and being selected from the group consisting of higher hydrocarbons, waxes, fats or mixtures thereof,
 b. 10 – 30 percent of at least one water-soluble or waterswellable polymer in solid, finely-divided form and being selected from the group consisting of dextran, lower hydroxy-alkyl dextran, carboxymethyl dextran, lower hydroxy-alkyl cellulose, lower alkyl cellulose, carboxy-methyl cellulose, polyvinyl alcohol, dextrin, starch, polyvinyl pyrrolidone and polyalkylene glycols, the particle size of the polymer being less than approximately 150 microns,
 c. 0.5 – 20 percent of at least one substance having a topical effect on the eye, being in solid, finely-divided form, with a particle size less than approximately 150 microns, and being selected from the group consisting of drugs for glaucoma therapy and substances showing a mydriatic effect,
 d. 10 – 60 percent of at least one member of the group consisting of aliphatic monoalcohols having 13 – 22 carbon atoms, to serve as stabilizer for the mixture,
the percentages relating to percent by weight calculated on the total weight of the mixture, whereby when said solid shaped body is inserted in an eye cavity and comes into contact with tear fluid, the polymer set forth in (b) which comes into contact with fluid dissolves into a viscous solution or gel-like envelope that acts as a lubricating envelope, which, in cooperation with the shape of the unit
 1. contributes to preventing mechanical irritation of the eye as a result of the shaped body and prevents the body from remaining in a specific position in the eye cavity, since it enables the unit to change position within the cavity,
 2. forms a diffusion barrier for the drug or drugs for glaucoma therapy and therewith prevents a topical overdose with subsequent accompanying irritation, and
 3. is free from difficulties with vision caused by ointment spread to the corneus tunic of the eye.

* * * * *